March 21, 1950    E. M. DENNY    2,501,596
REEL
Filed Nov. 16, 1945    2 Sheets-Sheet 1

INVENTOR
E. M. DENNY
BY O. F. Kane
ATTORNEY

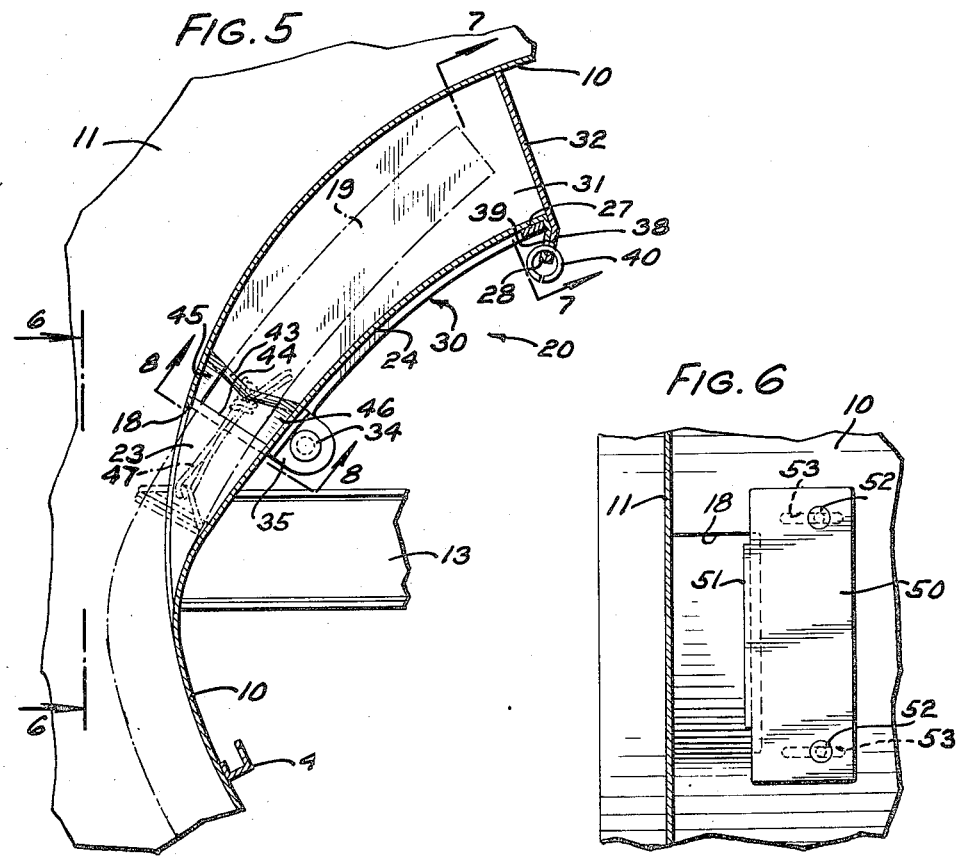

UNITED STATES PATENT OFFICE 2,501,596

REEL

Edson M. Denny, Oak Park, Ill., assignor to Western Electric Company, Incorporated, New York, N. Y., a corporation of New York Application November 16, 1945, Serial No. 629,167

8 Claims. (Cl. 242—77)

This invention relates to reels and more particularly to cable reels having a port in the drum thereof and a closure member therefor.

It has been common practice to provide a port in one head of the cable reel for receiving therethrough one end of the cable wound thereon for the purpose of testing the cable at various times during the installation thereof. Cable reels, when the cable thereon is being installed, are generally mounted on a rod supported by a pair of standards and are transported in a vehicle. Frequently during the installation of a cable, due to various causes, such as the sudden stopping of the conveying vehicle, the cable moves relative to the reel and causes the end of the cable to be further extended through the port and beyond the reel and to become entangled with and damaged by the members supporting the reel.

An object of the present invention is to provide a cable reel constructed to support material wound thereon with the inner end of the material protected from damage but readily accessible.

In one embodiment of the invention, there is provided a reel having an open-ended drum to the ends of which are attached annular reel heads, the drum being provided with a port adjacent a reel head to receive the inner end of a cable wound thereon and being provided with a closure for the port in the form of a receptacle for enclosing the end of the cable projecting through the port.

The invention will be more fully understood from the following description taken in connection with the drawings, in which Fig. 1 is a side elevation of a reel with the invention applied thereto;

Fig. 5 is a fragmentary transverse sectional view through the port and the receptacle taken on the line 5—5 of Fig. 2;

Fig. 6 is a fragmentary face view of a portion of the reel with parts in section and indicated by the line 6—6 of Fig. 5;

Fig. 7 is an enlarged fragmentary sectional view through the receptacle taken on the line 7—7 of Fig. 5; and Fig. 8 is an enlarged sectional view through the port and receptacle taken on the line 8—8 of Fig. 5.

The invention is shown as applied to a metal-type reel 9 comprising a drum 10 having open ends, to the outer peripheral surface of which are fixed annular heads 11 and 12 of any suitable construction. Cross members 13 and 14 are secured to the ends of the drum 10 and are provided with apertures 15—15 through which a rod may be inserted to rotatably support the reel 9.

Figure 1:
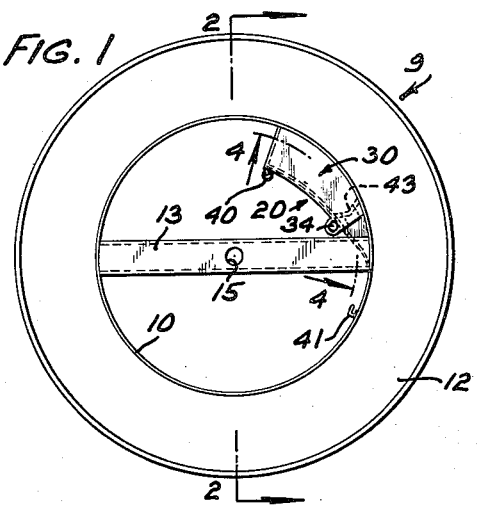
Figure 2:
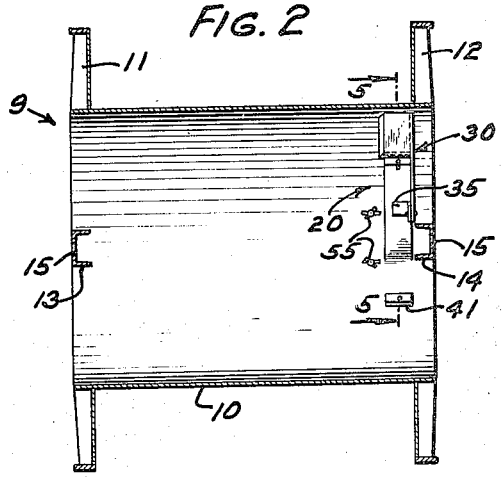
Fig. 2 is a vertical section of the reel taken on the line 2—2 of Fig. 1.
Figure 3:
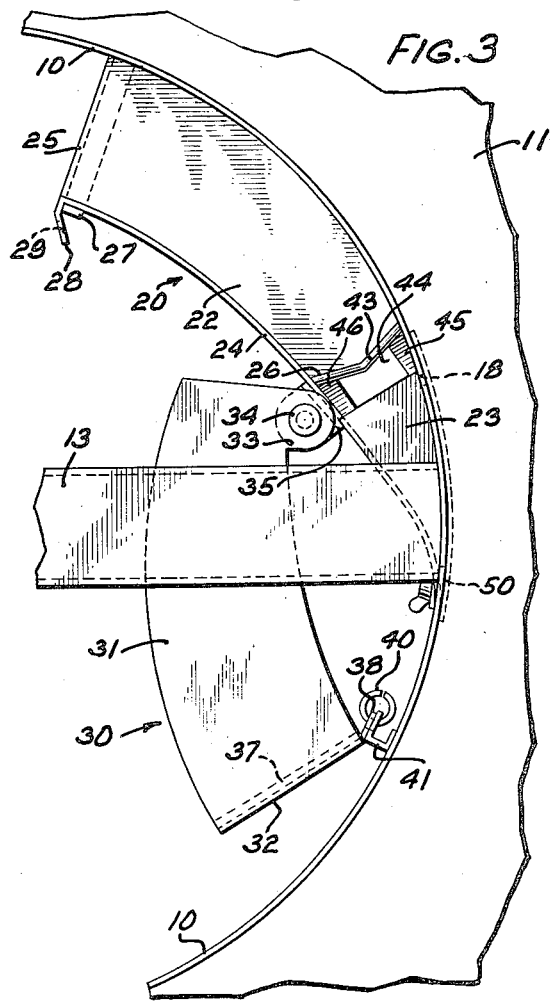
Fig. 3 is an enlarged elevational view of a portion of the reel showing the receptacle thereon and a cover member therefor in an open position.
Figure 4:
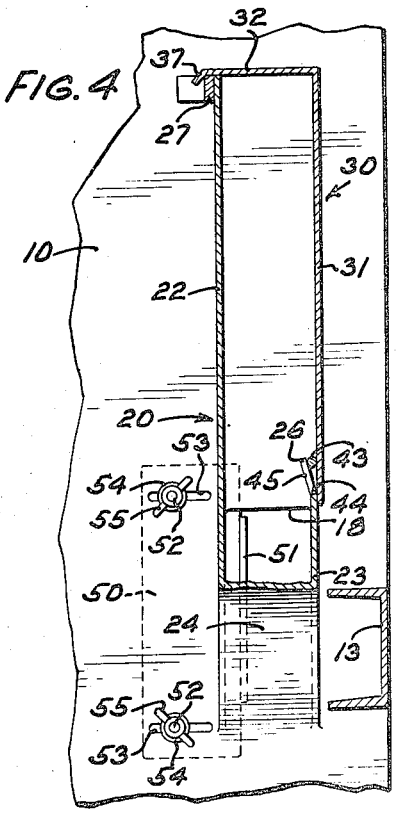
Fig. 4 is a fragmentary sectional view taken on the line 4—4 of Fig. 1.

Adjacent the head 12 of the reel 9, the drum 10 is provided with a port 18 in the form of a rectangular aperture or passageway through which is inserted one end of a cable 19 that is to be wound on the reel. A casing 20 is secured to the inner periphery of the drum and forms a receptacle for receiving the end of the cable projecting through the port 18. The casing or receptacle 20 comprises spaced flat walls 22 and 23 positioned in substantial alignment with the side edges of the port 18 and a curved wall 24 formed integrally with the walls 22 and 23 and which is connected to the front edge of the port 18 and forms a continuation of the wall of the drum 10. The casing thus forms a curved receptacle of rectangular cross section secured to the inner periphery of the drum and extending from the port. The end 25 of the receptacle 20 is open. The curved wall 24 and the rear flat wall 22 (Fig. 3) are coextensive in length and terminate at 25 whereas the front wall 23 is shorter and terminates as indicated at 26 (Figs. 3, 4 and 5) to provide a side opening in the receptacle. The end of the cable 19 positioned within the receptacle is accessible through the side and end openings of the receptacle. A reinforcing strip 27 is secured to the end portion of the receptacle to reinforce the walls 22 and 24 and the end of the wall portion 24 is bent radially and angularly to form a flange 28 which is apertured at 29 (Figs. 3 and 5).

A movable cover or closure member 30 pivotally mounted on the casing 20, is provided to close the end and side openings of the casing 20. The closure member 30 comprises a flat side portion 31 shaped to conform to the curvature of a portion of the side of the receptacle and an end portion 32 disposed at right angles to the side portion 31 and adapted to close the end of the casing 20. An ear 33 is formed on the plate 31 and is connected by a pivot member 34 to a bracket 35 secured to the curved wall portion 24 of the casing 22 (Figs. 3, 5 and 8). The end wall 32 of the closure member is provided with flanges 37 and 38, the latter of which is apertured at 39 (Fig. 5) and is adapted to fit against the flange 28 when the closure member 30 is in its closed position. A ring 40 may be inserted through the aligned apertures in the flanges 28 and 38 to lock the cover in place. The closure member 30 may be rotated to its open position indicated in Fig. 3 and locked in that position by inserting the ring 40 or other means through the aperture 39 in the flange 38 and an aligned aperture in a bracket 41 secured to the inner periphery of the drum 10.

In order to retain the end of the cable 19 in proper position within the receptacle and prevent relative displacement between the cable and the reel during the reeling operation, means are provided in the receptacle to which the end of the cable may be secured. This comprises an anchor member or bent rod 43 welded to the end portion of the side wall 23 and to the curved wall 24 of the casing 20 and to the drum 10. The end portion of the side wall 23 is slotted or notched at 44 to provide clearance for the intermediate portion of the rod 43. The wall portions 45 and 46 on opposite sides of the slot 44 are bent inwardly to position the rod 43 within the casing 20 so that the cover 30 may be closed without interference therewith. The end of the cable 19 enclosed in the receptacle may be secured to the rod 43 by any suitable means such as a strand of material 47 tied to the cable 19 and to the rod 43.

If desired, the port 18 may be made adjustable to accommodate cables of various sizes by providing a plate 50 (Figs. 6 and 8) in adjustable overlapping relation to the port. The plate 50 is provided with a curled edge 51 which, with the opposite edge of the port 18, determines the width of the port. A pair of studs 52—52, secured to the plate 50 and passing through slots 53—53 in the drum, are provided with washers 54—54 and thumb nuts 55—55 for securing the plate 50 in adjusted position.

At the beginning of the reeling operation, the end of the cable 19 is inserted through the port 18 into the receptacle 20 and fastened by means of the strand 46 to the rod 43, after which the reeling operation proceeds to its completion. On completion of the reeling operation, the cable may be tested and the closure 30 may be moved to its closed position and locked by the fastening means 40. Subsequently, at any time, as, for instance, during the installation of the cable, the closure member 30 may be opened and access had to the end of the cable within the receptacle for the purpose of further testing the cable.

What is claimed is:

1. A cable reel comprising a drum having one end thereof open, heads at the ends of said drum, said drum having a port therein for receiving therethrough one end of a cable wound on said reel, a wall connected to the drum at one edge of the port and extending inwardly and circumferentially a substantial distance in spaced relation to said drum and forming a continuation of the cable supporting surface thereof, a pair of side walls extending from said wall portion to said drum, and an end wall extending from said wall portion to said drum, said wall portions forming a receptacle on the inner periphery of said drum for receiving the end of said cable extending through said port, said receptacle having portions thereof movable to provide an opening therein through which the end of said cable is accessible.

2. A cable reel comprising a drum having one end thereof open, heads at the ends of said drum, said drum having a port therein for receiving therethrough one end of a cable wound on said reel, a receptacle on the inner periphery of said drum enclosing said port and extending circumferentially therefrom for receiving the end of said cable extending through said port and having an end and side opening therein through which the end of said cable is accessible, said receptacle comprising a wall portion joined to the drum at one edge of the port and forming a continuation of the cable supporting surface thereof, side walls extending from said wall portion and joined to said drum in substantial alignment with opposite edge portions of the port and a closure member movably mounted on said receptacle for closing said opening in said receptacle.

3. A cable reel comprising a drum having one end thereof open, heads at the ends of said drum, said drum having an aperture therein for receiving one end of the cable wound on said drum, a tubular receptacle disposed on the inner periphery of said drum in a plane substantially perpendicular to the axis of said drum and associated with said aperture for receiving the end of said cable extending through said aperture, said receptacle comprising a wall portion joined to the drum at one edge of the aperture and forming a continuation of the cable supporting surface thereof and side walls extending from said wall portion and joined to said drum in substantial alignment with the side edges of the aperture, said receptacle having an end and side opening therein through which the end of said cable is accessible, a movable closure member mounted on said receptacle for closing said opening in said receptacle, and means for retaining said closure member in closed position on said receptacle.

4. A cable reel comprising a drum having one end thereof open, heads at the ends of said drum, said drum having an aperture therein for receiving therethrough one end of a cable wound on said reel, a receptacle on the inner periphery of said drum associated with said aperture for receiving the end of said cable extending through said aperture and having an opening therein through which the end of said cable is accessible, said receptacle comprising a wall portion joined to the drum at the edge of the aperture and forming a continuation of the cable supporting surface thereof, side walls extending from said wall portion and engaging said drum in substantial alignment with the side edges of the aperture, a closure member for closing said opening in said receptacle, and a member on said receptacle to which said end of said cable may be secured.

5. A cable reel comprising a drum having one end thereof open, heads at the ends of said drum, said drum having an aperture therein for receiving therethrough one end of a cable wound on said reel, a receptacle on the inner periphery of said drum associated with said aperture for receiving the end of said cable extending through said aperture and having an opening therein through which the end of said cable is accessible, said receptacle comprising a wall portion joined to the drum at one edge of the aperture and forming a continuation of the cable supporting surface thereof, side walls extending from said wall portion and joined to the drum in substantial alignment with the side edges of the aperture, a pivoted closure member movable to and from a closed position and an open position for closing said opening in said receptable, means for retaining said closure member in said closed position, and means for retaining said closure member in open position.

6. A cable reel comprising a drum, heads at the ends of said drum, a port in said drum for receiving therethrough one end of a cable wound on said drum and a housing on the inner wall of said drum enclosing said port and extending circumferentially therefrom forming a receptacle for the end of the cable extending therein and having an opening therein through which the end of said cable is accessible, said housing comprising a wall joined to said drum at one edge of said port and extending inwardly and circumferentially beyond said port a substantial distance in spaced relation to said drum and forming a continuation of the cable supporting surface thereof, and side walls extending from said wall portion to said drum.

7. A cable reel comprising a drum, heads at the ends of said drum, a port in said drum for receiving therethrough one end of a cable wound on said drum, and a housing on the inner wall of said drum enclosing said port and extending circumferentially therefrom forming a receptacle for the end of the cable extending therein and having an opening therein through which the end of said cable is accessible, said housing comprising a wall joined to said drum at one edge of said port and extending inwardly and circumferentially beyond said port a substantial distance in spaced relation to said drum and forming a continuation of the cable supporting surface thereof, side walls extending from said wall portion to said drum, and a movable closure member for closing said opening in said receptacle.

8. A cable reel comprising a drum, heads at the ends of said drum, said drum having a port therein for receiving one end of the cable wound on said drum, a receptacle on the inner periphery of said drum communicating with and beginning at the port and extending a substantial distance circumferentially therefrom for receiving one end of said cable extending through said port, said receptacle comprising a wall portion joined to the drum at one edge of the port and extending inwardly and circumferentially beyond said port a substantial distance in spaced relation to said drum and forming a continuation of the cable supporting surface thereof, side walls extending from said wall portion and joined to said drum in substantial alignment with the side edges of the port, said receptacle having an opening therein through which the end of the cable therein is accessible, and a member on said receptacle to which said end of said cable may be secured.

EDSON M. DENNY.

REFERENCES CITED

The following references are of record in the file of this patent:

UNITED STATES PATENTS

| Number | Name | Date |
|---|---|---|
| 1,527,478 | Harper | Feb. 24, 1925 |
| 2,305,630 | McNeil | Dec. 22, 1942 |
| 2,329,943 | Robins | Sept. 21, 1943 |